Jan. 17, 1956  B. A. MAIN, JR  2,731,279
FITTING FOR REINFORCED HOSE
Filed Sept. 14, 1950  5 Sheets-Sheet 1
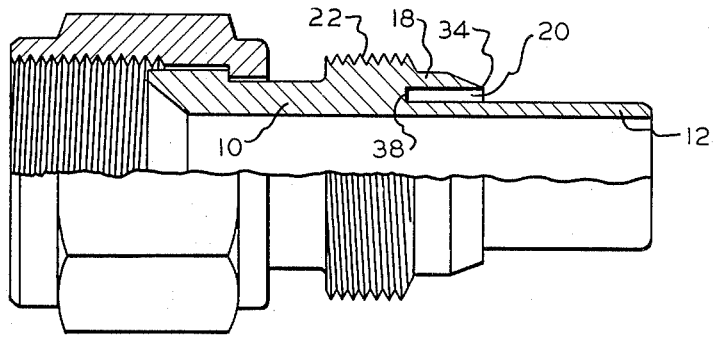
FIG. I.
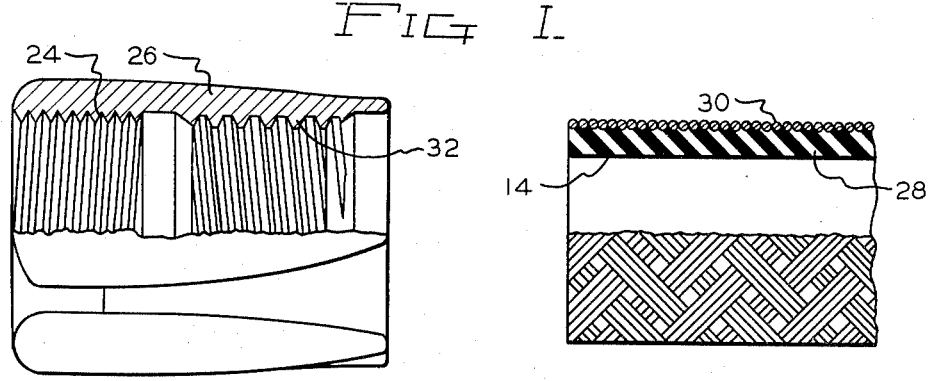
FIG. II.  FIG. III.
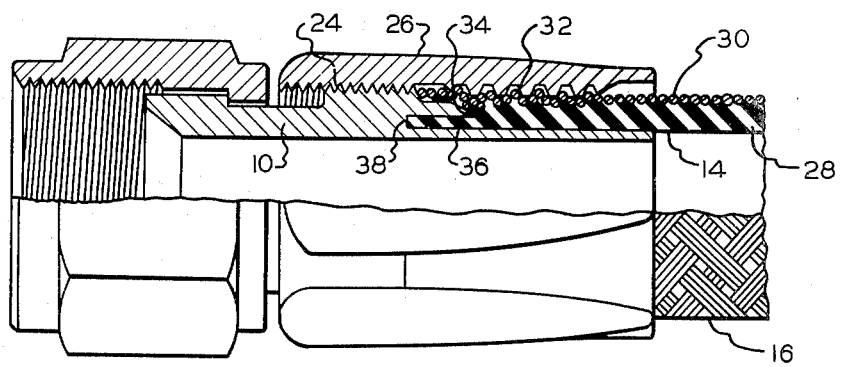
FIG. IV.
Inventor
BENJAMIN A. MAIN, JR.
ATTORNEY

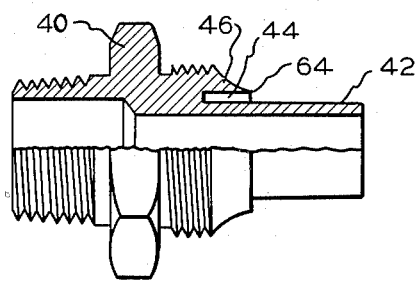
FIG. V.
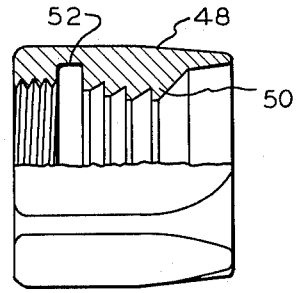
FIG. VI.
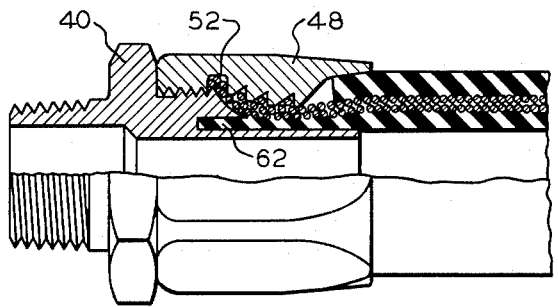
FIG. VIII.
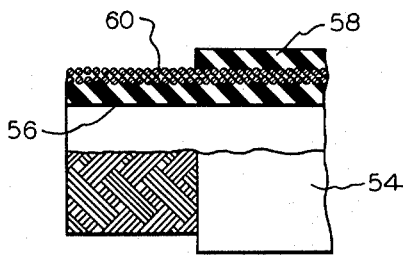
FIG. VII.
Inventor
BENJAMIN A. MAIN, JR.
ATTORNEY Jan. 17, 1956   B. A. MAIN, JR   2,731,279
FITTING FOR REINFORCED HOSE
Filed Sept. 14, 1950   5 Sheets-Sheet 3
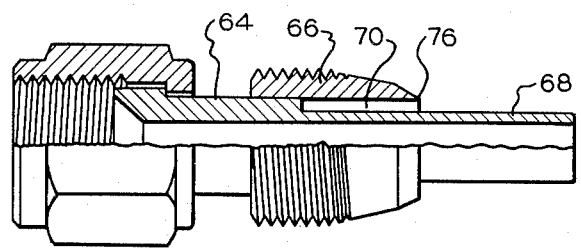
FIG. IX.
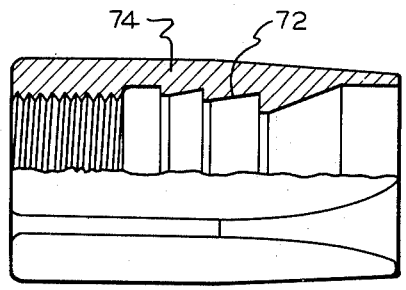
FIG. X.
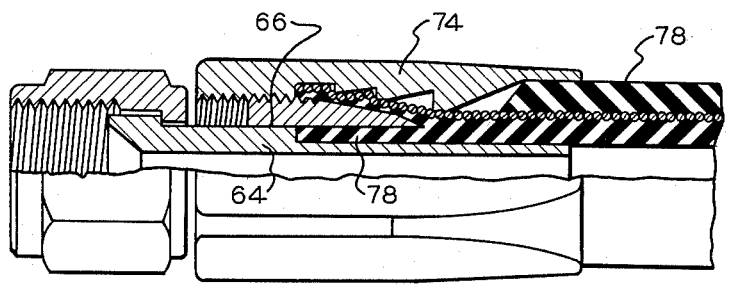
FIG. XI.
INVENTOR
BENJAMIN A. MAIN, JR.
BY
ATTORNEY

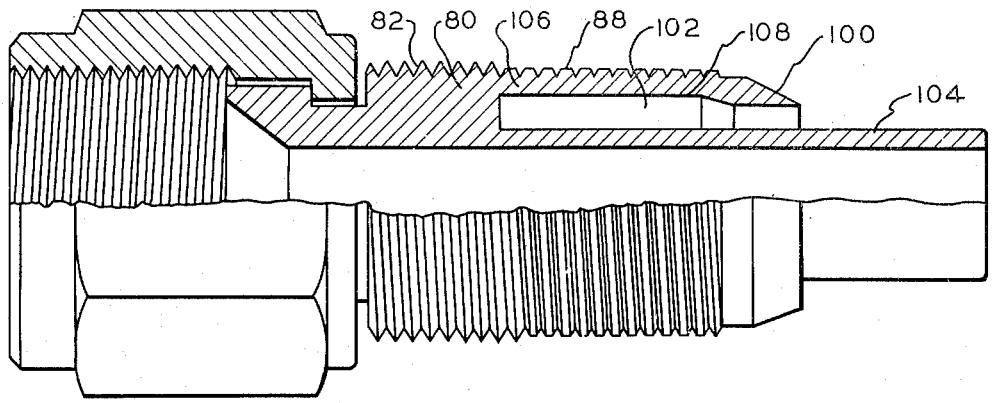
FIG. XII.
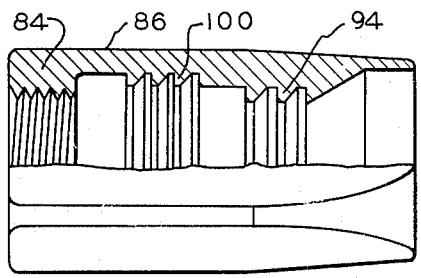
FIG. XIII.
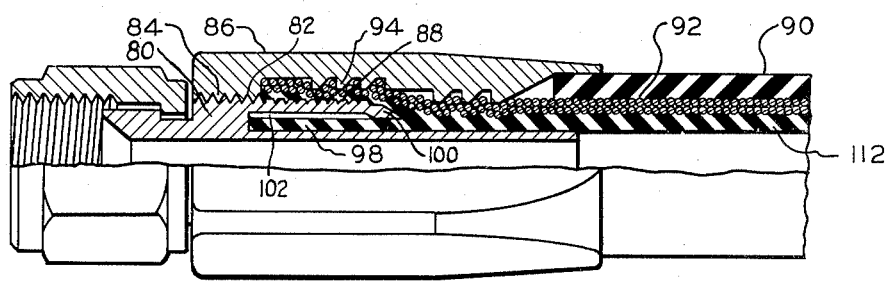
FIG. XIV.
INVENTOR
BENJAMIN A. MAIN, JR.
BY
ATTORNEY Jan. 17, 1956 B. A. MAIN, JR 2,731,279
FITTING FOR REINFORCED HOSE
Filed Sept. 14, 1950 5 Sheets-Sheet 5
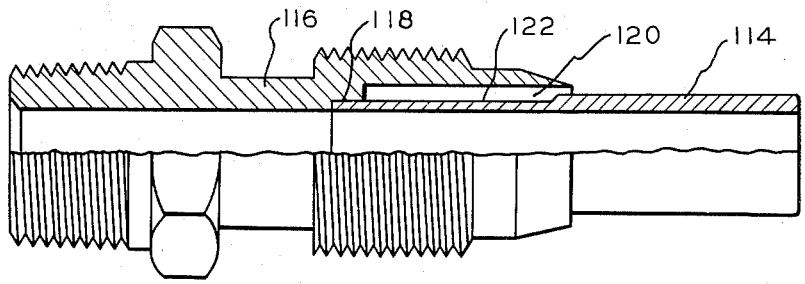
FIG. XV.
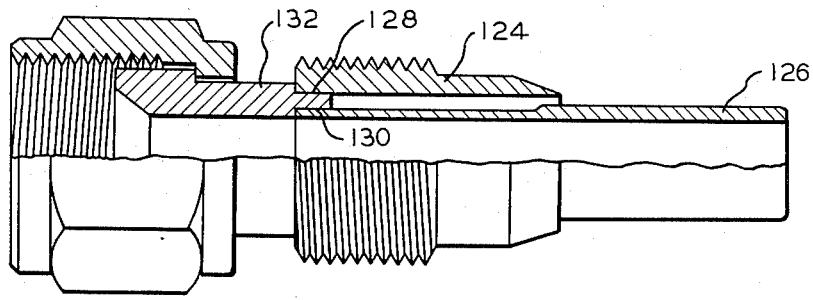
FIG. XVI.
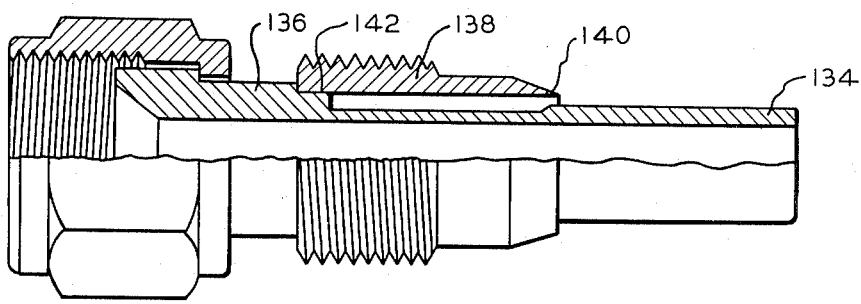
FIG. XVII.
INVENTOR
BENJAMIN A. MAIN, JR.
BY *Leonard F. Beaman*
ATTORNEY

United States Patent Office 2,731,279
Patented Jan. 17, 1956

2,731,279

FITTING FOR REINFORCED HOSE

Benjamin A. Main, Jr., Jackson, Mich., assignor to Aeroquip Corporation, Jackson, Mich., a corporation of Michigan Application September 14, 1950, Serial No. 184,813

5 Claims. (Cl. 285—86)

The present invention relates to improvements in end fittings for flexible hose and method of sealing and holding the ends of flexible hose.

At the present time the compression type hose fitting is extensively employed. In this type of fitting a short length of the entire carcass of the hose, adjacent an end, is squeezed between the circumferential surfaces of the socket and nipple to seal off leakage of fluid or other medium passing through the bore.

When the nipple is inserted in the compression type hose fitting, it expands the bore of the hose and wedges the carcass between the outside surface of the tapered nipple and the inner surface of the socket. In general, this compression force is not of equal magnitude through the length of the area of compression, but is more concentrated at one or more circumferential sections, where the outside diameter of the nipple is in closest juxtaposition with the inside diameter of the socket.

In flexible hose of the aforesaid type, the hose has an inner tube of rubber-like material such as natural or synthetic rubber, plastic, and the like, which makes up a large percentage of the total thickness of the hose carcass wall. With the compression type fitting the inherent relative incompressibility of the inner tube works to a disadvantage as the actual holding power of the end fitting and the sealing off of leakage of the carried medium in the hose is greatly dependent upon the inner tube's retention of a high percentage of its original shape, qualities of resiliency, hardness and other allied characteristics.

As it is the areas of concentrated compression that perform the holding and sealing function of the compression type of fitting now in general use, several outstanding objections arise to its use in numerous cases:

(a) In hose where low temperature flexibility is desired, it becomes impractical to use a soft highly plasticized inner tube stock as the soft tube tends to flow under the compression force.

(b) Being incompressible, the rubber-like material of the inner tube has a tendency to flow away to each side of a compression concentration. When first assembled this tendency is not too objectionable as the resiliency of the tube stock keeps a steady return force against the original mechanically induced compression force. However, as the tube stock fatigues, either as cold flow or under high temperatures, this flow proceeds at an accelerated rate away from the compression point, allowing a great reduction of the original compression force.

(c) For very high pressure application, a corresponding high compression on the hose carcass is necessary to hold the fitting on the hose and to seal off leakage. This extremely high squeeze on the inner tube at the point of compression concentration thins the inner tube out to such an extent that actual breakage of the tube is likely to occur especially after a short aging period.

According to the present invention the above mentioned disadvantages of the compression type fitting have been overcome by so modifying the construction as to bring into functional operation an annulus form from the inner tube of the hose which seals off leakage by the action of the fluid pressure.

Preferably the sealing annulus is cut from the hose structure by the assembling operation of the nipple within the socket. However, the annulus may be provided in advance of the assembly as disclosed in the Trevaskis Patent No. 2,451,522.

As the sealing annulus functions independent of compressive forces on the inner tube, it becomes possible to confine the use of compression forces for the sole purpose of holding the fitting in position on the end of the hose while the cut in the inner tube is being made during assembly. This is accomplished by compressing that portion of the hose carcass which remains following the formation of the sealing annulus in a manner similar to that heretofore employed in compression type fittings.

Thus an object of the invention is to provide an improved detachable type hose fitting in which a portion of the hose in the form of an annulus sealing member functions between concentric cylindrical surfaces to seal under both positions of negative pressure.

Another object is to provide an improved detachable, reusable type hose fitting in which the act of assembly of the socket and nipple provides a sealing annulus from the inner wall of the hose.

A further object is to provide a fitting of the type stated in the preceding paragraph in which the sealing off of leakage is accomplished through fluid pressure urging a portion of the hose against a wall of the fitting while the holding of the fitting to the hose is accomplished by compression force exerted upon another portion of the hose.

These and other objects and advantages residing in the present invention and particularly in the combination, arrangement and construction of associated parts will more fully appear from a consideration of the following specification and claims.

In the drawings, wherein several forms of the invention are illustrated.

Fig. I is a side elevational view partly shown in vertical cross-section of the nipple embodying the present invention, Fig. II is a view similar to Fig. I of a socket associated with the nipple to complete the fitting, Fig. III is a view similar to Fig. I of a wire braided hose section, Fig. IV is a view of the assembly of the parts shown in Figs. I to III, inclusive, Fig. V is a view similar to Fig. I of a slightly modified form of the invention, Fig. VI is a side elevational view partly shown in vertical cross-section of the socket used with the nipple in Fig. V, Fig. VII is a side elevational view of a hose construction partly shown in vertical cross-section with the outer covering being removed from one end to expose the wire braid, Fig. VIII is a side elevational view partly shown in cross-section of an assembly of the parts shown in Figs. V to VII, inclusive, Fig. IX is a side elevational view partly shown in cross-section of the nipple construction having portions thereof brazed together following separate fabrication, Fig. X is a side elevational view partly shown in cross-section of a socket associated with the nipple of Fig. IX, Fig. XI is a side elevational view partly shown in vertical cross-section of the socket and nipple of Figs. IX and X assembled upon the end of a hose section, Fig. XII is a further modification of the invention, it being a side-elevational view partly shown in vertical cross-section of a nipple specially adapted to high pressures, Fig. XIII is a view similar to Fig. XII of the socket used with the nipple construction of Fig. XII, Fig. XIV is a view similar to Fig. XII showing the assembly of the socket and nipple of Figs. XII and XIII, upon the end of a hose section, and Figs. XV, XVI and XVII are side elevational views partly shown in cross-section of different forms of nipple construction embodying the present invention disclosing several possible arrangements for the separate fabrication and the brazing together of portions of the nipple construction.

In the drawings, in the form of Figs. I to IV, inclusive, the female nipple 10 comprises a pair of inner and outer nipple portions in the form of a cylindrical sleeve portion 12 having an outer diameter approximating the diameter of the bore 14 of the hose 16 and the embracing sleeve portion 12, in radial spaced relation, the latter having a sharp edged cylindrical portion 18 which, with the portion 12, defines an annular recess 20. The threaded portion 22 engages with the internal threads 24 of the socket 26.

The hose 16, as illustrated, is of conventional wire braided construction with an inner tube portion 28 and an outer, uncovered, wire braided portion 30.

To assemble the hose 16 to the fittings of Figs. I and II, the socket 26 is applied over the end of the hose 16 with the left hand threads 32 assisting the operation. The nipple 10 is then inserted into the socket 26 with the sleeve portion 12 entering the bore 14 until the threads 22 engage the threads 24. The first few turns of the nipple 10 relative to the socket 26 will cause a slight compression to be set up between the sleeve portion 12 and the smallest inside diameter of the socket 26. As the screwing action is continued, the sharp leading edge 34 of the portion 18 cuts into the inner tube 28 and a circular section or flap 36 (see Fig. IV) slides into the annular recess 20. This original slight compression set up on the hose 16 is merely to hold the hose in the socket 26 while the edge 20 is cutting the circular rubber flap 36, and is not for final holding of the end fitting on the hose or to seal off leakage.

When the nipple 10 is fully screwed into the socket 26 the wall of the hose 16, minus the flap 36, is gripped firmly between the outer diameter of the portion 18 and the inner diameter of the grooves or threads of the socket 26. This gives dependable holding power for the fitting without danger of loss of compression due to having a heavy thickness of inner tube engaged between the holding surfaces.

The sealing off of the leakage at the fitting is accomplished by the circular section or flap 36 enclosed between the inside surface of the portion 18 and the outside surface of the portion 12. The fluid or other medium flowing through the bore 14 of the hose 16 under pressure, squeezes between the outer surface of the portion 12 and the inner surface of the inner tube 28 back to the junction 38 between the portions 12 and 18. Here the flow stops as the pressure of the medium working on the larger area of the inside of the flap 36 is greater than that encountered at the end of the flap 36 and pushes the outside surface of the flap 36 against the inside of the portion 18 providing a seal past which the medium can not proceed.

Some of the advantages of the construction shown in Fig. IV over the compression type fitting includes (1) the ability to employ tube stock having good low temperature characteristics, (2) as there is very little compression set up by the entrance of the portion 12 of the nipple into the bore 14 of the hose, very soft tube stocks can be used without danger of heavy bulges or cuts, (3) good sealing off of leakage and holding characteristics at high temperatures are obtained as they are independent of compression forces upon the inner tube, and (4) as the reinforcement of the high pressure type hose is gripped directly between two metal surfaces with no intervening inner tube, the high pressure performance is excellent as the holding compression will remain constant for the life of the hose.

In the form of the invention shown in Figs. V to VIII, inclusive, the male nipple has a sleeve portion 42 forming an annular recess 44 with a sharp edged portion 46. The socket 48 is provided with a series of steps or ledges 50 in lieu of the left hand threads 32 of Fig. II and a recess 52. The hose 54, as shown in Fig. VII, has an inner tube 56 of rubber and an outer layer of rubber 58 which has been removed to expose that portion of the wire braid 60 which is held between the portion 46 and the inner surfaces of the socket 48.

The sealing flap 62 is cut from the inner tube 56 by the sharp edge 64 in the manner described with reference to the flap 36 of Fig. IV and functions in the same manner to seal off leakage.

Figs. IX to XI, inclusive, show a further modification in which the portion 66 is fabricated separate from the portion 68 and then brazed to form the assembly of Fig. IX. This arrangement is of considerable importance where a long recess 70 is required in order to give a considerable amount of exposed wire braid to be clamped between the portion 66 and the inner surface 72 of the socket 74. In practice it has been found difficult to effectively grip the wire braid directly adjacent the end of the hose in extremely high pressure installation. For this reason high pressure hose construction is provided with a depth annular recess 70 to provide a grip upon the wire braid more remote from the end of the hose than shown in the form of Fig. VIII, for example. As heretofore described in detail with reference to the assembly of Fig. IV, the sharp edge 76 cuts the flap 78 at the time the fitting parts are assembled on the hose 78.

In Figs. XII to XIV, inclusive, is shown another modification of the invention especially designed for relatively large size, high pressure, multiply wire braid hose. The nipple 80 has a sharp threaded portion 82 to engage the internally threaded portion 84 of the socket 86 as well as a flat threaded portion 88.

Prior to assembly the outer cover 90 is stripped from the two-ply wire braid 92. Left hand threads 94 assist in holding the hose 96 during the steps of assembling the fitting parts and cutting the sealing flap 98 by the advancing sharp edge 100. To reduce the amount of friction between the flap 98, while it is being cut, and the recess 102, formed between the portion 104 and the portion 106, a relief is provided at 108 to increase the clearance of the recess 102 inwardly from the sharp edge 100. This relief may be provided either in the portion 108, as shown, or in the portion 104, or both, as desired. The inner surface of the socket 86 opposite the flat threads 88 (between which the wire braid 92 is gripped) takes the form of concentric, longitudinally spaced steps or shoulders 110.

It will be noted from Fig. XIV that the metal-to-metal grip upon both sides of the wire braid 92 by the portions 88 and 104 is of substantial longitudinal extent. While the preferred practice is to strip the outer covering 90 from the wire braid before assembly and cut the inner tube 112 from the wire braid to form the flap 98 during assembly contemplated and considered within the scope of the invention to cut the flap 98 partially or fully before assembly, as disclosed in the aforesaid patent.

In Figs. XV, XVI, and XVII are illustrated several nipples showing different production designs for facilitating the machining and assembly of the nipple. Fig. XV shows an arrangement whereby the portion 114 is formed from tube stock and brazed to the main body portion 116 at 118. A relief in the annular recess 120 is provided by reducing the outside diameter of the portion 114 at 122. In the form of Fig. XVI both the portions 124 and 126 are brazed at 128 and 130, respectively, to the nipple portion 132. Fig. XVII shows the portion 134 integral with the nipple portion 136 with the threaded portion 138 having the sharp edge 140 being brazed to the portion 136 at 142.

Having thus described my invention what I claim as new and desire to protect by Letters Patent is:

1. A hose and detachable reusable end fitting assembly of the type embodying a nipple and socket having threaded telescoping engagement upon relative rotation for exerting compressive forces upon the hose and located between opposed wall portions of the nipple and socket comprising a hose having a bore defined by an inner tubular portion of rubber-like relatively non-compressible material subject to flow under compressive forces as well as volumetric changes following assembly, an embracing outer tubular portion of said hose reinforcing said inner tubular portion, a circular slit extending axially inward from an end of said hose and forming from said inner tubular portion an annular sealing flap or tube portion, said nipple having an externally threaded body portion and inner and outer radially spaced concentric tubular nipple portions joined at one end to define an axially extending open end annular recess in which said sealing tube portion is disposed, said inner nipple portion being an extension of the bore defining portion of said nipple and having a snug fit within the bore of said hose and extending axially substantially beyond said outer nipple portion at one end of said nipple, said outer nipple portion being disposed in said annular slit and being relatively non-deformable by the compressive forces of assembly whereby said recess has a relatively fixed volume, the free end portion of the outer nipple being tapered, said socket having a bore portion to receive an end of said hose with a snug fit and having means to compress the hose outside of said recess between said socket and said outer and inner nipple portions, a part of said socket being internally threaded to receive the externally threaded portion of said nipple with the bore portion of said socket radially opposed to said outer nipple portion when assembled being radially spaced therefrom to receive the outer tubular portion of the hose which is disposed upon the outer wall of said outer nipple, the bore portion of said socket radially opposed when assembled to said inner nipple being radially spaced therefrom to receive that part of said hose axially spaced from said outer nipple, that portion of said hose embracing said sealing tube portion and having its inner wall defining said slit being disposed on the outer wall of said outer nipple portion and being subjected to the compressive forces of assembly between said nipple and socket with said sealing tube portion disposed in said recess having substantial freedom from such forces whereby sealing takes place between a wall of said recess and said sealing tubular portion primarily by relative fluid pressures and the compressive forces of assembly serve primarily to retain said hose within the socket.

2. A hose and fitting assembly as defined in claim 1 wherein said outer tubular reinforcing portion of said hose is in the form of wire braid.

3. A hose and fitting assembly as defined in claim 1 wherein said outer nipple portion has a sharp leading edge for severing said slit upon relative axial movement between said socket and nipple with said hose compressively held in fixed relation to the wall of said socket while the bore of said hose is being piloted with relative movement on said inner nipple portion.

4. A hose and fitting assembly as defined in claim 1 wherein said outer nipple portion has a sharp leading edge for severing said slit upon relative axial movement between said socket and nipple with said hose compressively held in fixed relation to the wall of said socket while the bore of said hose is being piloted with relative movement on said inner nipple portion, the opposed walls of said inner and outer nipple portions defining said recess being shaped to form a relief inwardly of said leading edge.

5. A hose and end fitting assembly as defined in claim 1 wherein said inner and outer nipple portions are separately formed and fitted together to complete said nipple.

References Cited in the file of this patent

UNITED STATES PATENTS

| | | |
|---|---|---|
| 1,977,219 | Williams | Oct. 16, 1934 |
| 2,029,846 | Von Henke | Feb. 4, 1936 |
| 2,219,266 | Hirsch | Oct. 22, 1940 |
| 2,328,819 | Luebkeman | Sept. 7, 1943 |
| 2,371,971 | Main et al. | Mar. 20, 1945 |
| 2,428,189 | Wolfram | Sept. 30, 1947 |
| 2,431,522 | Trevaskis | Nov. 25, 1947 |
| 2,463,293 | Mentel | Mar. 1, 1949 |
| 2,476,480 | Burckle et al. | July 19, 1949 |